Figure 1:
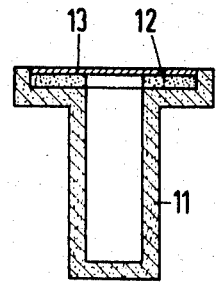

United States Patent [19]

Tschermak

[11] 3,720,996

[45] March 20, 1973

[54] PROCESS FOR THE MANUFACTURE OF A RIGID CONNECTION BETWEEN A SYNTHETIC BODY AND A METAL BODY

[75] Inventor: Manfred Tschermak, Erlangen, Germany

[73] Assignee: Siemens Aktiengesellschaft, Berlin and Munchen, Germany

[22] Filed: Oct. 15, 1969

[21] Appl. No.: 866,592

[30] Foreign Application Priority Data

Oct. 16, 1968 Germany............P 18 03 307.3

[52] U.S. Cl. ............29/527.1, 29/588, 264/272, 264/134, 29/472.9
[51] Int. Cl. ............B29c 6/02
[58] Field of Search..29/530, 527.1, 569, 588, 472.7, 29/473.1, 472.3, 472.5, 489, 492, 470.1; 317/234 E; 136/120 FC; 264/272, 262, 134, 472.9

[56] References Cited

UNITED STATES PATENTS

| | | | |
|---|---|---|---|
| 2,712,174 | 7/1955 | Hubbell | 29/473.1 |
| 2,995,462 | 8/1961 | Mitchell | 29/530 |
| 3,103,067 | 9/1963 | Dixon | 29/473.1 |
| 3,330,026 | 7/1967 | Best | 29/470.1 |
| 3,386,159 | 6/1968 | Milch | 29/492 |
| 3,413,711 | 12/1968 | Brewer | 29/492 |
| 3,417,460 | 12/1968 | Galmiche | 29/473.1 |
| 3,487,536 | 1/1970 | Goldstein | 29/492 |
| 3,495,322 | 2/1970 | Goldstein | 29/473.1 |
| 3,511,906 | 5/1970 | Bergemann | 136/120 FC |
| 3,515,595 | 6/1970 | Sanford | 136/120 FC |
| 3,598,896 | 8/1971 | Hassler et al. | 29/588 |

Primary Examiner—Charles W. Lanham
Assistant Examiner—Daniel C. Crane
Attorney—Curt M. Avery, Arthur E. Wilfond, Herbert L. Lerner and Daniel J. Tick

[57] ABSTRACT

The method of producing a firm connection between a synthetic body and a metal body. The region of the synthetic body intended for the connection has a, at least partially, porous sintered metal body of predetermined shape inserted into it in such a way that the synthetic material of the synthetic body penetrates the pores of the sintered metal body. An additional metal body (bodies) is fastened to the exposed portion of the sintered metal body.

5 Claims, 2 Drawing Figures

PROCESS FOR THE MANUFACTURE OF A RIGID CONNECTION BETWEEN A SYNTHETIC BODY AND A METAL BODY

The object of my invention is to produce a tight connection between a synthetic body and a metal body, and more particularly hermetically to seal a synthetic or plastic body by means of a metal body. Accordingly, the invention relates to a method for establishing a tight connection between a synthetic (plastic) and a metal body.

My invention achieves its object by providing the region of the synthetic member which is to be connected, with a, at least partially, porous sintered metal body of predetermined form in such a way that the synthetic material penetrates into the pores of the sintered metal body. Additional metal bodies are connected to the portion of the sintered metal body which is exposed. The connection can be effected, for example, by soldering, welding or screwing together.

Preferably, the sinter metal body is compressed or cast with the synthetic body, in a mold. The pores of the sintered metal body must be filled to such an extent that the resulting composite body will be of sufficient density for its intended purpose.

The method of the invention is suitable e.g. for producing a hermetic metal seal of a hollow synthetic body, particularly for the purpose of encapsulating semiconductor components.

Figure 2:
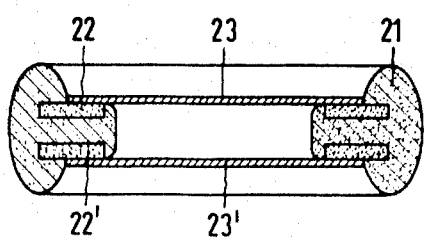

The invention will be disclosed in greater details with reference to the embodiments illustrated in the drawing, wherein:

FIG. 1 is the seal of a hollow synthetic body produced according to the invention; and FIG. 2 shows the seal of a synthetic ring, produced according to the invention.

FIG. 1 schematically illustrates a hollow synthetic body provided with a metallic seal in accordance with the present invention. Seen in this figure are the hollow synthetic body 11, a ring 12 of porous sinter metal, such as iron, copper, nickel, and a metal disc 13 serving as a seal.

The ring 12 of porous sinter metal is in a form compressed or cast together with the hollow synthetic body 11 so that the synthetic material penetrates at least partially into the pores of the sintered metal of the ring 12. This results in a tight connection. Metallic disc 13 is soldered upon the thus produced compound material of the synthetic saturated sintered body, so that the hollow body 11 is tightly sealed.

FIG. 2 is to show how a synthetic ring can be provided with metallic seals, according to the method of the invention. Such a sealed ring can be expediently used, e.g. in the construction of wafer shaped semiconductor components. Seen in FIG. 2 are the synthetic material ring 21, rings 22 and 22' of porous sinter material, and metal foils 23 and 23'.

Rings 22 and 22' of porous sintered material, for example iron, copper, nickel, are compressed or cast together with the synthetic ring in a form so that the synthetic material penetrates, at least partially, into the sintered material, resulting in a firm and dense connection. The resultant compound material of the rings 22 or 22', saturated with synthetic material, is subsequently provided with metal foils 23 and 23' by soldering or by welding, so that the ring 21 is sealed on top and on the bottom.

The method of the invention also permits joining of two synthetic components by means of soldering, welding or joining by screws, provided each of the synthetic materials is provided with appropriate armatures comprising sintered metal/synthetic compound material.

Details of the sintered metal/plastic or synthetic material can be found in application Ser. No. 866,591, now abandoned, filed concurrently herewith and based on German application No. P 18 16 412.0 of Dec. 21, 1968.

I claim:

1. A method of producing a tight connection between a synthetic body and a metal body, which comprises inserting at least partially a porous sintered metal body of predetermined shape into the synthetic body, pressing the sintered metal body and synthetic body in a mold whereby the plastic material of the synthetic body penetrates the pores of the sintered metal body, and thereafter connecting an additional metal body to the exposed portion of the sintered metal body.

2. The method of claim 1, wherein a metal wafer is soldered to the exposed portion of the sintered metal body.

3. The method of claim 1, wherein a metal foil is soldered to the exposed portion of the sintered metal body.

4. The method of claim 1, wherein a metal wafer is welded to the exposed portion of the sintered metal body.

5. The method of claim 1, wherein a metal foil is welded to the exposed portion of the sintered metal body.

* * * * *